United States Patent [19]

Schreiner et al.

[11] 4,410,068
[45] Oct. 18, 1983

[54] DISC BRAKE AND ANTI-RATTLE SPRING THEREFOR

[75] Inventors: Peter J. Schreiner, Mishawaka; John F. Limberg, Granger, both of Ind.; Mark J. Cybulski, Chicago, Ill.

[73] Assignee: The Bendix Corporation, Southfield, Mich.

[21] Appl. No.: 292,459

[22] Filed: Aug. 13, 1981

[51] Int. Cl.³ .............................................. F16D 65/00
[52] U.S. Cl. ................................. 188/73.38; 188/73.44
[58] Field of Search ................. 188/72.4, 73.31, 73.32, 188/73.33, 73.34, 73.35, 73.36, 73.37, 73.38, 73.39, 73.41, 73.43, 73.44, 73.45, 205 A; 267/81, 140.4, 152; 192/30 V

[56] References Cited

U.S. PATENT DOCUMENTS

| 3,806,627 | 4/1974 | Harmon | 267/152 |
|---|---|---|---|
| 3,998,296 | 12/1976 | James | 188/73.38 |
| 4,027,751 | 6/1977 | Gérard | 188/73.38 |
| 4,056,174 | 11/1977 | Wienand et al. | 188/73.36 |
| 4,084,665 | 4/1978 | Burnett | 188/73.45 |
| 4,194,597 | 3/1980 | Evans et al. | 188/73.38 |
| 4,214,649 | 7/1980 | Fujimori et al. | 188/73.38 |
| 4,244,451 | 1/1981 | Johannesen | 188/73.45 |
| 4,245,723 | 1/1981 | Moriya | 188/73.38 |
| 4,285,417 | 8/1981 | Ostwald | 188/73.43 |
| 4,318,458 | 3/1982 | Ritsema | 188/73.44 |
| 4,330,049 | 5/1982 | Cybulski et al. | 188/73.39 |
| 4,335,806 | 6/1982 | Lüpertz | 188/73.39 |

FOREIGN PATENT DOCUMENTS

| 489498 | 9/1976 | Australia | 267/152 |
|---|---|---|---|
| 2328773 | 12/1973 | Fed. Rep. of Germany | 188/73.38 |
| 2042660 | 9/1980 | United Kingdom | 188/73.43 |

Primary Examiner—Douglas C. Butler
Assistant Examiner—R. R. Diefendorf
Attorney, Agent, or Firm—Paul David Schoenle; Ken C. Decker

[57] ABSTRACT

A disc brake (10) includes a support member (22) movably interlocking with a pair of friction elements (42, 44) to dispose the friction elements adjacent a rotatable brake disc (12). The friction elements define abutment surfaces (88, 90) movably engaging a caliper (60) straddling the brake disc (12) and friction elements (42, 44) so that the friction elements support the caliper. An axially extending pin (110) is carried by the support member (22) and received in an axially-extending bore (112) defined by the caliper so that the caliper (60) is also supported by the axially-extending pin. The caliper (60) includes pairs of axially-spaced projections (96, 98, and 100, 102) and the friction elements (42, 44) define slots (92, 94) aligning with the projections. A pair of resilient members (104, 106) extend axially through the slots (92, 94) of the friction members (42, 44) and engage the projections (96, 98, and 100, 102) of the caliper to interlock the caliper (60) and friction elements (42, 44). A single anti-rattle spring (122) is carried in a groove (118) defined by the support member (22). The anti-rattle spring engages the pair of friction elements (42, 44) and cooperates with the support member (22) to yieldably bias the pair of friction elements (42, 44) into engagement with the support member (22).

4 Claims, 6 Drawing Figures

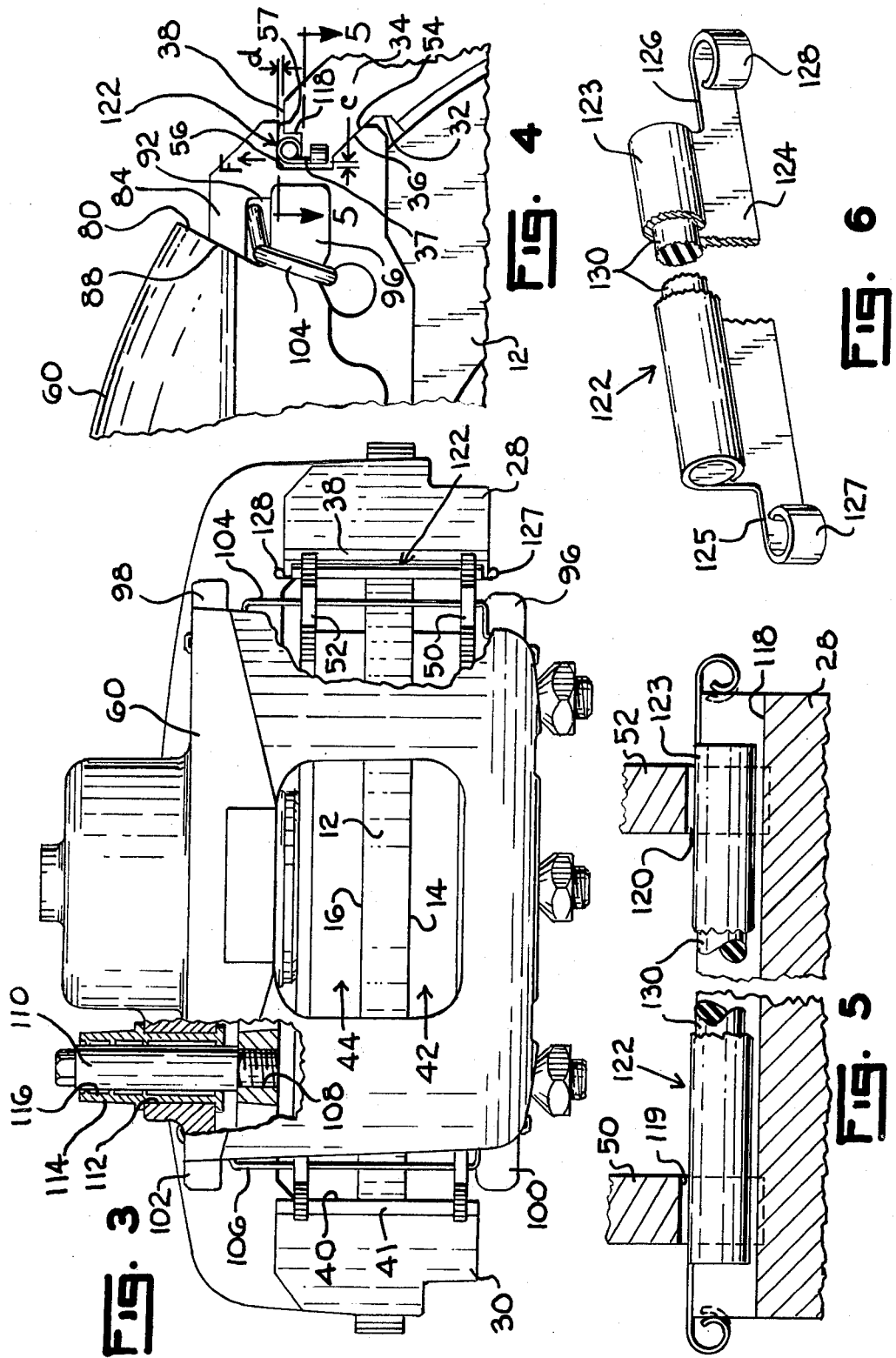

DISC BRAKE AND ANTI-RATTLE SPRING THEREFOR

The invention relates to a disc brake. More particularly, the invention relates to a disc brake of the type including a rotatable brake disc having friction faces thereon. A caliper includes a pair of legs straddling the brake disc and cooperating with a pair of friction elements to urge the friction elements into engagement with the friction faces of the brake disc. A non-rotatable support member movably carries the caliper. The support member substantially prevents radial and circumferential movement of the caliper while allowing axial movement of the caliper relative to the brake disc.

Accordingly, this invention relates to a disc brake comprising a support member disposing a pair of friction elements and a caliper adjacent a rotatable brake disc, said caliper cooperating with said pair of friction elements to urge the latter into engagement with said brake disc to retard rotation thereof effecting a brake application, and an anti-rattle spring cooperating with said pair of friction elements to inhibit rattling thereof.

A sliding caliper disc brake is known in accordance with the U.S. Pat. No. 4,027,751, (hereinafter '751) issued June 7, 1977 to J. Gerard wherein a support member carries a pair of circumferentially spaced, axially-extending pins. A caliper defines a pair of bores which slidably receive the axially-extending pins so that the caliper is movably carried on the axially-extending pins. The caliper defines a pair of legs straddling the brake disc. A recess defined by the caliper between the pair of legs receives a pair of friction elements which interlock with the caliper. Each of the pair of friction elements carries a noise-reducing spring which engages the caliper to bias torquetransferring abutment surfaces of the friction elements and caliper into engagement with one another.

Another sliding caliper disc brake is known in accordance with the U.S. Pat. No. 4,056,174 (hereinafter '174), issued 1 November 1977 to H. Wienand et al, wherein a support member includes a pair of circumferentially spaced, axially extending arms which are radially spaced outwardly of the perimeter of the brake disc. The arms extend axially through the radial planes defined by the friction faces of the brake disc and define a recess therebetween. A pair of friction elements are received in the recess in torque-transferring abutting relation with the arms of the support member. The arms of the support member define a pair of axially extending bores therein. A caliper is received in the recess of the support member and carries a pair of axially extending pins which are slidably received in the bores of the support member. As a result, the caliper is slidably carried by the support member via the axially extending pins. The caliper defines a pair of legs which straddle the brake disc and the pair of friction elements. Each of the friction elements carries an anti-rattle spring which engages the caliper to urge the friction element radially inwardly within the recess of the support member.

With a disc brake of the type illustrated by the '751 patent, all of the braking torque is transferred from the friction elements to the caliper during a brake application. The caliper transfers the braking torque to the support member via the axially extending pins. Because the friction elements are offset axially relative to the pair of pins, the caliper may pivot relative to the brake disc and support member. The caliper may pivot in an axially extending plane which is defined by the axes of the pair of pins. As a result, the caliper may not slide freely on the pair of pins during a brake application. Further, as is well known in the art, reaction forces on the caliper during a brake application distort the caliper so that the caliper legs are spread apart or forced to move axially away from each other. As a result, the caliper legs are angulated relative to each other. Because the caliper legs oppose the friction elements, angulation of the caliper legs causes angulation of the friction elements and resultant uneven wear. Additionally, because the friction elements engage a circumferentially extending segment of the brake disc, a portion of the friction elements is subject to friction forces having a radially outwardly directed component. The outwardly directed friction forces are transferred to the caliper. As a result, the caliper may tilt radially outwardly. The caliper may tilt in an axially extending radial plane extending between the pair of pins. In the case of the outboard friction element which is on the side of the brake disc opposite the pair of pins, the tilting of the caliper adds to the angulation of the caliper leg caused by distortion of the caliper so that uneven wear of the outboard friction element is exacerbated.

With a disc brake of the type illustrated by the '174 patent, the friction elements cooperate with the support member so that braking torque is transferred directly to the support member during a brake application. However, the reaction forces distort the caliper, as was explained supra, so that the caliper legs are angulated relative to one another. Further, the outwardly directed radial friction forces are transferred from the friction elements to the caliper because of the frictional engagement of the caliper legs with the friction elements during a brake application. Consequently, tilting of the caliper results in and exacerbates the uneven wear of the outboard friction element.

Further, disc brakes according to both the '751 and '174 patents include a pair of axially-extending pins carried by the support member or caliper and a pair of bores defined by the caliper or support member for slidably receiving the axially-extending pins. Because the axially-extending pins and bores must precisely coincide with each other in order for the caliper to be axially movable relative to the support member and brake disc, precision manufacturing methods must be employed in order to make the disc brakes. Such precision manufacturing methods add to the expense of manufacturing the disc brakes.

The invention as claimed is intended to avoid or ameliorate one or more of the shortcomings of prior disc brakes by providing a disc brake characterized in that said anti-rattle spring includes an elongate resilient split sleeve engaging said support member and said pair of friction elements, and a cylinder of elastomeric material received within said split sleeve.

The advantages offered by the invention are mainly that the single anti-rattle spring cooperates with the pair of friction elements and with the support member to inhibit rattling of both of the pair of friction elements; the anti-rattle spring may be removably secured to the support member while the pair of friction elements are removably secured to the caliper so that assembly and maintenance of the disc brake is simplified in comparison to prior disc brakes; each of the pair of friction elements may define a saddle for receiving the caliper so that only a single pin-slider structure is needed to connect the caliper to the support member. Because only a single pin-slider structure may be required to connect the caliper to the support member, assembly and disassembly of the caliper, and of the friction elements secured thereto, with the support member requires only insertion or removal of the single pin of the single pin-slider structure.

A preferred embodiment of the invention is described in detail below with reference to drawings which illustrate only the preferred embodiment of the invention, in which:

FIG. 3 is a fragmentary view along line 3—3 of FIG. 1 and partly in cross section of the disc brake illustrated by FIGS. 1 and 2;

FIG. 4 is a fragmentary enlarged view of an encircled portion of FIG. 1;

FIG. 5 is an enlarged fragmentary view taken along the line 5—5 of FIG. 4; and

FIG. 6 is a fragmentary isolated perspective view of an anti-rattle spring according to the invention.

Figures 1, 2:
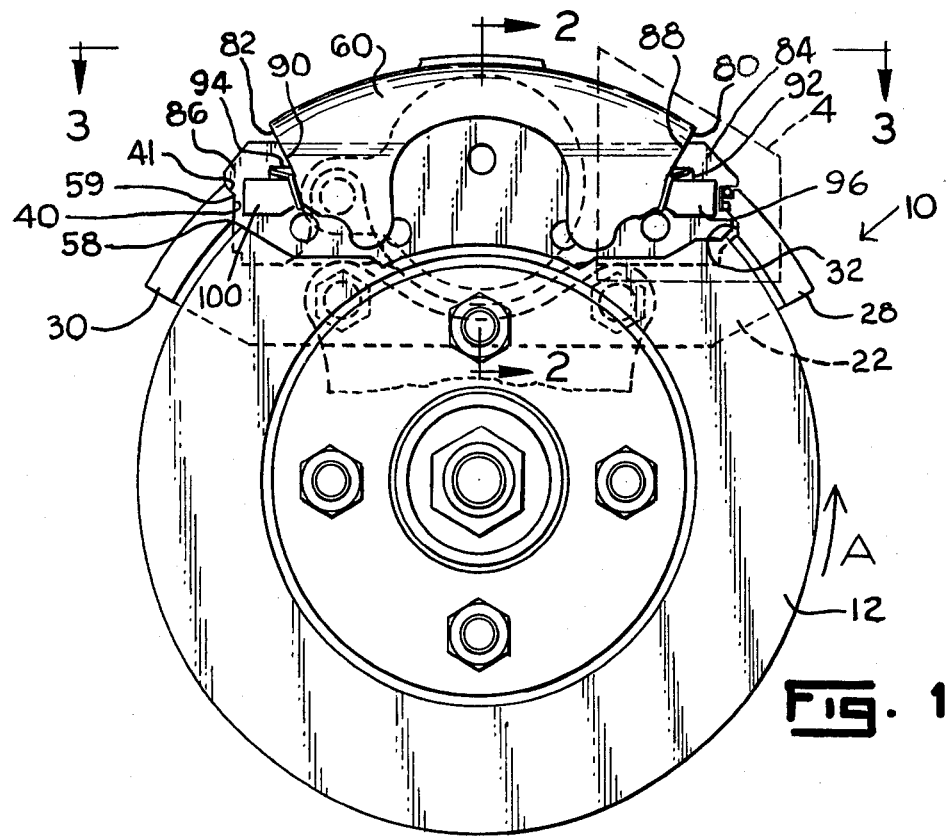
FIG. 1 is an elevation view of a disc brake according to the invention.
FIG. 2 is a fragmentary cross-sectional view taken along the line 2—2 of FIG. 1.

The figures show a disc brake 10 including a rotatable brake disc 12 having friction faces 14 and 16 on opposite sides thereof. The brake disc 12 is coupled by threaded fasteners 18 for rotation in unison with an axle 20 to be braked. A non-rotatable support member 22 is connected by threaded fasteners 24 to a torque-taking structure 26 which journals the axle 20. The support member 22 includes a pair of axially-extending arms 28 and 30 which are circumferentially spaced to define a recess 32 therebetween. The arms 28 and 30 are spaced radially outwardly from the perimeter of the brake disc 12 and extend axially through the radial planes defined by the friction faces 14 and 16 on the brake disc, viewing FIG. 3. The arm 28 includes a projection 34 extending circumferentially into the recess 32 to define a trio of axially-extending abutment or guide surfaces 36, 37 and 38. The arm 30 defines a pair of axially-extending abutment or guide surfaces 40 and 41. The guide surfaces 37 and 40 extend substantially parallel to a radially extending axial plane through the center of the recess 32.

A pair of friction elements 42 and 44 are movably received in the recess 32 of the support member 22. The friction elements include friction linings 46 and 48, respectively, which are engageable with the friction faces 14 and 16 of the brake disc 12. The friction linings 46 and 48 are secured to backing plates 50 and 52. Each of the backing plates 50 and 52 defines abutment surfaces 54, 56, 57, 58 and 59 slidably engaging the respective abutment surfaces 36, 37, 38, 40 and 41, of the arms 28 and 30 so that the support member 22 may receive braking torque from the friction elements 42 and 44.

Of course, the circumferential dimension of the backing plates 50 and 52 as defined by the surfaces 54-59 is slightly less than that of the recess 32 as defined by the surfaces 36-41. As a result, small clearances c and d (illustrated by FIG. 4) may exist among the abutment surfaces. Because of the small clearances, the friction elements may be shifted rightwardly, viewing FIGS. 1 and 4 so that they may be pivoted clockwise out of the recess 32 and removed radially outwardly from the support member 22. Conversely, the friction elements may be inserted radially inwardly into the recess 32 by counterclockwise pivoting movement.

A caliper 60 is movably received in the recess 32 of the support member 22. The caliper 60 includes a bridge portion 62 and a pair of radially inwardly extending legs 64 and 66, viewing FIG. 2. The leg 66 of caliper 60 defines a bore 68 movably receiving a piston 70 which cooperates with a closed end 72 of the bore 68 to define a variable-volume chamber 74. A groove 76 circumscribes the bore 68 and receives an annular sealing member 78 cooperating with the piston 70. The leg 64 and the piston 70 are engageable with the friction elements 42 and 44, respectively.

The caliper 60 includes radially and axially extending abutment surfaces 80 and 82. Projections 84 and 86 on the backing plates 50 and 52 of each friction element 42 and 44 extend radially outwardly and define abutment surfaces 88 and 90, respectively, slidably engaging the abutment surfaces 80 and 82 of the caliper 60. The abutment surfaces 88 and 90 of each friction element 42 and 44 are angularly disposed radially outwardly and are circumferentially spaced apart so that they cooperate to define a V-shaped saddle on each of the friction elements. The V-shaped saddles are disposed radially outwardly and are broad-based because of the circumferential spacing of the abutment surfaces 88 and 90. In other words, the legs of the "V" do not actually intersect at a vertex. The caliper 60 slidably rides in the saddles of the friction elements 42 and 44 via the abutment surfaces 80 and 82. Thus, the friction elements 42 and 44 are slidable axially relative to the support member 22 while the friction element 44 is slidable axially relative to the caliper 60. Of course, the friction element 42 is trapped between the caliper leg 64 and the brake disc 12 so that there is normally no relative sliding movement between the caliper and the friction element 42.

The projections 84 and 86 define slots 92 and 94 opening toward the center of the recess 32. The legs 64 and 66 of the caliper 60 define pairs of axially-spaced, circumferentially-extending projections 96, 98, and 100, 102 aligning at their upper surfaces with the slots 92 and 94. A pair of axially-extending resilient members or wire-forms 104 and 106 extend through the slots 92 and 94 of the backing plate projections 84 and 86 and engage the projections 96-102 of the caliper. The resilient members 104 and 106 are identical and have hook-shaped ends which engage the projections 96-102. Both of the resilient members 104 and 106 are torsionally distorted within the slots 92 and 94 so that the abutment surfaces 88 and 90 of the friction elements are resiliently biased into engagement with the abutment surfaces 80 and 82, respectively, of the caliper 60. Thus, it will be observed that the surfaces 36–38 and 54–57 at the right end of the friction elements (viewing FIGS. 1 and 4) interlock to restrain radial movement of the friction elements in both the inward and outward radial directions. At the left end of the friction elements, the surfaces 40, 41 and 58, 59 restrain radially inward movement of the friction elements. Further, the caliper rests upon the friction elements via the surfaces 80, 82 and 88, 90 and is interlocked therewith via the resilient members 104 and 106. Thus, the support member 22 carries the friction elements 42, 44 which in turn carry the caliper 60.

The support member 22 defines a bore 108, viewing FIG. 3, threadably receiving an axially-extending pin portion 110. Similarly, the caliper 60 defines a bore 112 receiving an elongated bushing 114. The bushing 114 defines a bore 116 slidably receiving the pin portion 110 so that the axially-extending pin portion 110 of the support member 22 also supports the caliper 60. The pin 110 restrains radially outward movement of the caliper 60. Thus, the friction elements 42, 44 at their left ends are radially trapped between the arm 30 and the surface 82 of the caliper 60.

The arm 28 of support member 22 defines an axially extending groove 118 which opens toward the pair of friction elements 42 and 44. Each one of the pair of friction elements 42 and 44 cooperates with the groove 118 to define one of a pair of apertures 119 and 120, respectively. An elongate anti-rattle spring 122 is disposed in the groove 118 and passes through the apertures 119 and 120. The anti-rattle spring 118 engages the surface 57 of each one of the pair of friction elements to yieldably bias the pair of friction elements radially outwardly (represented by arrow F viewing FIG. 4). Because the guide surface 36 on the arm 28 is angulated with respect to an axially extending radial plane passing through the center of the recess 32, the pair of friction elements slide radially outwardly along the surface 36 and toward the other arm 30 because of the force F until the surfaces 40 and 58 at arm 30 engage one another.

Anti-rattle spring 122 includes a resilient split sleeve 123, viewing FIGS. 4, 5 and 6, which has a leg 124 extending therefrom so that the sleeve is substantially P-shaped in transverse cross section. A pair of extensions 125 and 126 extend axially in opposite directions from the leg 124. The extensions 125 and 126 are rolled to form a pair of open, resilient loops 127 and 128. The loops 127 and 128 have a free position as is shown in FIG. 6 and by dashed lines in FIG. 5. The loops 127, 128 are distorted when the anti-rattle spring is received in the groove 118, viewing FIG. 5, so that the loops engage opposite axial ends of the arm 28 to releasably secure the anti-rattle spring to the arm 28. A cylinder of elastomeric material 130 is received within the split sleeve 123. The elastomeric cylinder 130 and the resilient split sleeve 123 in combination bias the friction elements 50 and 52 radially outwardly.

When a brake application is effected with the brake disc 12 rotating in a forward direction, which is indicated by arrow A, viewing FIG. 1, pressurized fluid is supplied to the variable-volume chamber 74, moving the piston 70 rightwardly, viewing FIG. 1. The piston 70 moves the friction element 44 into engagement with the friction face 16 on the brake disc 12. The pressurized fluid in the chamber 74 also acts on the closed end 72 of the bore 68 to move the caliper 60 leftwardly relative the brake disc 12 and support member 22, viewing FIG. 2. Consequently, the caliper 60 moves the friction element 42 into engagement with the friction face 14 on the brake disc 12. The caliper 60 is axially movable relative the support member 22 because the bushing 114 slidably receives the axially-extending pin portion 110 of support member 22, viewing FIG. 3, and because the abutment surfaces 80 and 82 of the caliper slidably engage the abutment surfaces 88 and 90 of the friction element 44 while the outboard friction element 42 slidably engages the support member 22 at the surfaces 36–38 and 40, 41. The inboard friction element 44 is axially movable, relative the support member 22, because the abutment surfaces 54–57 and 58, 59 of its backing plate 52 slidably engage the abutment surfaces 36–38 and 40,41 on the support member.

When the brake disc 12 is rotating in the direction indicated by the arrow A, which corresponds to forward vehicle movement, the arm 28 is a leading arm with which any point on the brake disc first comes into radial alignment. Consequently, during forward vehicle motion the arm 30 is a trailing arm. Viewing FIG. 1, braking torque generated by the frictional engagement of the friction elements 42 and 44 with the brake disc 12 is transferred from the friction elements to the support member 22 via the abutment surfaces 40 and 58 at the trailing arm 30. Because the frictional engagement of the friction linings 46 and 48 with the brake disc 12 extends circumferentially relative the brake disc, the friction elements are subject to a friction force which is directed radially outwardly, tending to pivot the friction elements counterclockwise, viewing FIG. 1. Because the friction elements define an interlocking fit with the support member at the projection 34 of the support member, the outwardly directed radial friction force is transferred to the support member 22 via the abutment surfaces 36 and 54.

When a brake application is effected with the brake disc 12 rotating in the reverse direction, opposite arrow A viewing FIG. 1, braking torque is transferred to the support member via the abutment surfaces 36–38, and 54–57. The outwardly directed radial friction force tends to pivot the friction elements clockwise, viewing FIG. 1. Because the friction elements do not define an interlocking fit with the support member 22 at the abutment surfaces 40, 41 and 58, 59 the outwardly directed friction force is transferred from the friction elements to the caliper 60 via the abutment surfaces 82 and 90. The caliper 60 transfers the outwardly directed friction force to the support member 22 via the axially-extending pin 110.

Those skilled in the art to which the invention pertains will recognize that the clearances existing between the friction elements and support member allow the friction elements and caliper 60 to be pivoted clockwise as a unit out of recess 32, viewing FIG. 1, after the pin 110 is removed. The resilient members 104 and 106 retain the caliper and friction elements together so that the caliper 60 may be removed from and installed into the recess 32 of the support member 22 as a unit with the friction elements. In order to separate the friction elements from the caliper after the caliper and friction elements have been removed from the recess 32, the friction elements are pivoted away from the caliper at one of their ends (radially inwardly relative to the caliper viewing FIG. 1) so that one of the resilient members 104 or 106 snaps out of its slot 92 or 94. The friction elements will then slide off the other of the resilient members. Because the anti-rattle spring 122 is releasably secured to the arm 28 of the support member 22 by the pair of resilient loops 127, 128, the anti-rattle spring will remain in its groove 118 during assembly and disassembly of the disc brake. Of course, the anti-rattle spring 122 may easily be removed from the arm 28 in order to allow its replacement, if necessary, with a new anti-rattle spring at the time of renewing the friction elements 42 and 44. Reassembly of the brake requires only the reversal of the above-outlined procedure.

We claim:

1. A disc brake comprising a support member disposing a pair of friction elements and a caliper adjacent a rotatable brake disc, said support member including a pair of circumferentially spaced arms, said caliper cooperating with said pair of friction elements to urge the latter into engagement with said brake disc to retard rotation thereof effecting a brake application, and an anti-rattle spring cooperating with said pair of friction elements to inhibit rattling thereof characterized in that said anti-rattle spring includes an elongate resilient split sleeve engaging said support member and said pair of friction elements, and a cylinder of elastomeric material received within said split sleeve, one of said arms defines an axially extending groove opening toward said pair of friction elements, said pair of friction elements cooperating with said groove to define a pair of apertures, said anti-rattle spring being received in said groove and passing through said pair of aperture, said one arm defines an axially extending guide surface which is angulated with respect to an axial plane extending substantially through the center of said recess, said guide surface extending radially outwardly toward said axial plane, said anti-rattle spring yieldably biasing said pair of friction elements radially outwardly into sliding engagement with said guide surface, and said guide surface moving said pair of friction elements toward the other of said pair of arms.

2. The invention of claim 1 wherein said one arm defines said groove radially outwardly of said guide surface.

3. A disc brake comprising a support member disposing a pair of friction elements and a caliper adjacent a rotatable brake disc, said caliper cooperating with said pair of friction elements to urge the latter into engagement with said brake disc to retard rotation thereof effecting a brake application, and an anti-rattle spring cooperating with said pair of friction elements to inhibit rattling thereof characterized in that said anti-rattle spring includes an elongate resilient split sleeve engaging said support member and said pair of friction elements, and a cylinder of elastomeric material received within said split sleeve, said resilient split sleeve includes a leg extending radially therefrom so that said split sleeve is substantially P-shaped in transverse cross section, said leg defining a pair of extensions which extend axially therefrom in opposite directions, said extensions being rolled to form a pair of open resilient loops, and said pair of open resilient loops being distorted to engage said one arm of said support member at opposite axial ends thereof to removably secure said anti-rattle spring within said groove.

4. A disc brake for a vehicle, said disc brake comprising:
a brake disc which is rotatable about an axis, said brake disc having friction faces on opposite sides thereof;
a nonrotatable support member disposed adjacent said brake disc, said support member having a pair of circumferentially spaced arms which are spaced radially outwardly of the perimeter of said disc, said pair of arms extending axially across the perimeter of said brake disc and defining a recess therebetween,
a pair of friction elements received in said recess adjacent opposite friction faces of said brake disc, said pair of friction elements being in torque-transferring abutting relation with said pair of arms, one of said pair of arms defining a pair of axially extending guide surfaces which are engageable by said pair of friction elements to constrain movement of the latter in both radial directions, one of said pair of axially extending guide surfaces being angulated so that radially outward movement of said pair of friction elements moves the latter circumferentially toward engagement with the other of said pair of arms, said other arm defining an axially extending guide surface which is engageable by said pair of friction elements to limit movement of the latter only in the radially inwardly direction, each of said pair of friction elements defining a pair of circumferentially spaced abutment surfaces which are angularly disposed radially outwardly and toward the center of said recess, said pairs of abutment surfaces cooperating to define a radially outwardly disposed V-shaped saddle on each one of said pair of friction elements;
a caliper received in said recess and straddling said pair of friction elements, said caliper defining axially extending abutment surfaces which cooperate with said circumferentially spaced abutment surfaces of said pair of friction elements so that said caliper is received in the V-shaped saddles of said pair of friction elements;
an anti-rattle spring carried by said one arm, said anti-rattle spring yieldably biasing said pair of friction elements radially outwardly; and
pin means extending between said caliper and said support member for slidably coupling one to the other so as to restrain radial relative movement thereof while allowing axial relative movement therebetween.

* * * * *